April 22, 1941.   S. PITT ET AL   2,239,400
CONTROL APPARATUS
Original Filed Oct. 8, 1937   2 Sheets-Sheet 1

INVENTORS
S. PITT
L. O. REICHELT
BY
E. R. Nowlan
ATTORNEY

April 22, 1941.  S. PITT ET AL  2,239,400
CONTROL APPARATUS
Original Filed Oct. 8, 1937  2 Sheets-Sheet 2

INVENTORS
S. PITT
L. O. REICHELT
BY
E.R. Nowlan
ATTORNEY

Patented Apr. 22, 1941

2,239,400

UNITED STATES PATENT OFFICE

2,239,400

CONTROL APPARATUS

Samuel Pitt, Westfield, and Lester O. Reichelt, Cranford, N. J., assignors to Western Electric Company, Incorporated, New York, N. Y., a corporation of New York Original application October 8, 1937, Serial No. 168,030. Divided and this application April 7, 1938, Serial No. 200,668

5 Claims. (Cl. 172—240)

This invention relates to control apparatus and more particularly to a control means for an electric motor.

This apparatus is a division of our copending application Serial No. 168,030 filed October 8, 1937.

In numerous arts apparatus and machines are used having parts or elements which require to be driven in to and fro motion, either in continuously recurrent cycles or in single cycles at will, with accurate control of excursion to and fro.

An object of the present invention is to provide accurate and reliable means to control an electric motor.

With this and other objects in view one embodiment of the invention comprises an electric motor to effect variation of driving means for a member movable in cyclically repeated to and fro reciprocation, switches actuable by the reciprocable member at the limits of its excursion to automatically control the motor, and manually operable switches to control the motor at will.

Other objects and advantages will appear from the following detailed description taken in connection with the accompanying drawings, in which Fig. 1 is a partly diagrammatic view in elevation of an apparatus illustrating the invention;

Figure 1:
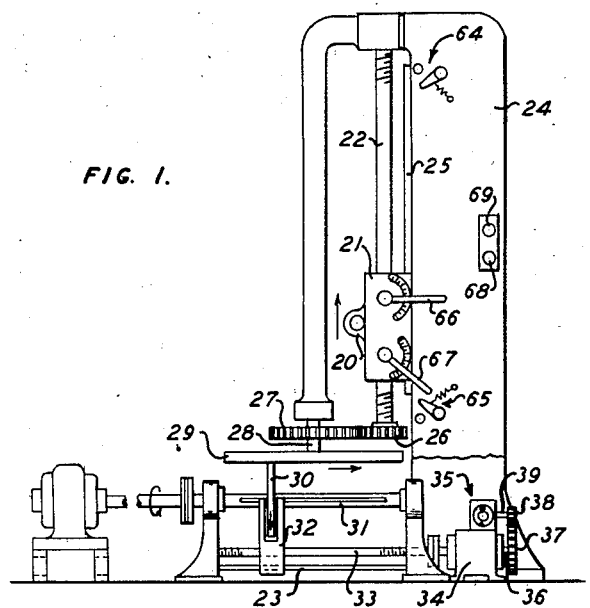

To illustrate one embodiment of the invention the motor control means is shown in connection with a distributing mechanism as used in many strand combining apparatus. In the present instance it may be assumed that a cable or other strand coming from some strand handling apparatus (not shown) passes through a guide member 20 and thence to a vertically disposed take-up reel (also not shown) to be wound thereon. Function of the guide member 20 is to carry the cable or strand up and down to distribute it in even, closely wound layers on the reel.

The guide 20 is mounted on a nut 21 which is driven up or down by a threaded shaft 22 rotatably supported in a stationary frame or standard 24 mounted on the floor or other suitable support. A guide rail 25 engages the nut 21 slidably in a notch or perforation in the nut to keep the nut from rotating.

A gear 26 rigid on the shaft 22 is driven by a gear 27 rigid on a shaft 28 suitably mounted to rotate on the frame or support 24. The shaft 28 is driven by a friction disc 29 secured on the lower end of the shaft 28, and the disc 29 is driven in turn at variable speed and in either direction by a coacting disc, 30, whose periphery runs against the flat under face of the disc 29 and in contact with that face always at some point of a diameter thereof.

The disc 30 is mounted on a longitudinally slotted shaft 31 which lies below and diametrically across the under face of the disc 29. The disc 30 is longitudinally slidable on the shaft 31 but is compelled to rotate therewith by a key or stud on the disc 30 extending into the slot of the shaft 31.

The shaft 31 is driven by some power means, such as the motor illustrated in Fig. 1, to run at constant rotational speed and thus drives the shaft 22 in a direction and at a speed depending upon the position of the disc 30 on the shaft 31 relative to the disc 29.

The disc 30 may be shifted along the shaft 31 by means of a yoke 32 whose arms lie one on each side of the disc 30 and whose body is mounted on and reciprocated by a threaded shaft 33 rotatably mounted parallel to the shaft 31 in appropriate supports. The yoke 32 is kept from rotation on the shaft 33 by a guide 23.

The shaft 33 may be driven, to shift the yoke 32 and thereby the disc 31, by a motor 34, here shown as a three phase, induction, squirrel cage motor, but which may be of any suitable construction. The motor 34 is here shown for simplicity as directly connected to the shaft 33, but suitable reduction gearing may be interposed between the motor and the shaft if desired.

Figure 3:
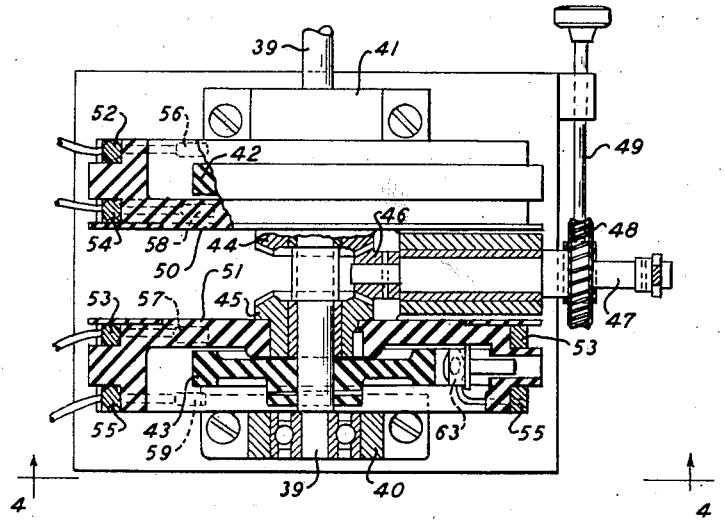
Fig. 3 is an enlarged detached plan view partly in section of a portion of the motor control means.
Figure 4:
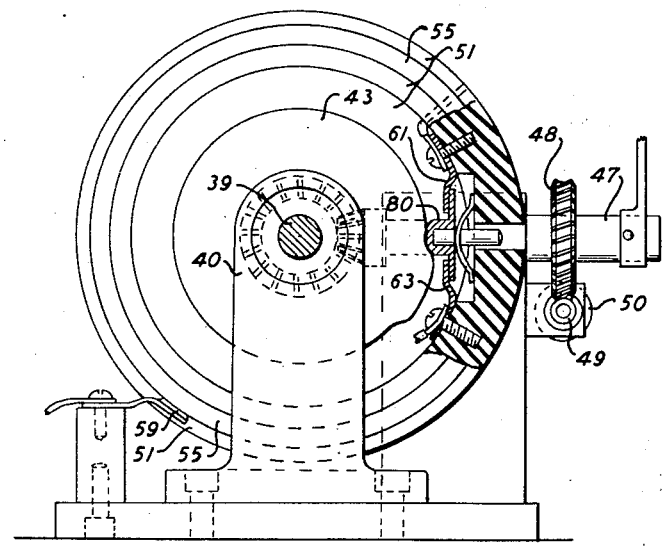
Fig. 4 is an elevational view thereof partly in section.

A control device, generally indicated at 35 and shown on an enlarged scale and in detail in Figs. 3 and 4, may be conveniently mounted on the motor 34, as shown in Fig. 1, to be driven by the motor through suitable gears 37 on the motor shaft 36 and 38 on the control device shaft 39. In Figs. 3 and 4, the control device is shown with the housing removed, which housing appears in Fig. 1.

The shaft 39 (see now Figs. 3 and 4) is journalled in antifriction bearings in a pair of supports 40 and 41, and has keyed or pinned to it a pair of identical rotary cams 42 and 43 preferably of insulating material such as hard fibre. A pair of symmetrically identical bevel gears 44 and 45 is mounted on the shaft 39 to be independently freely rotatable thereon and both engage with a bevel gear 46 pinned to a shaft 47 journalled to stand at right angles to the shaft 39. A worm gear 48 is also secured on the shaft 47 and engages with a worm shaft 49 having a knurled head by manipulation of which the shaft 49, worm gear 48, shaft 47 and bevel gear 46 may be actuated to rotate the gears 44 and 45 to adjust the relative angular position of these last two gears with respect to each other.

Identically symmetrically similar discs 50 and 51 are mounted on and keyed to the gears 44 and 45, respectively, to be rotated by the gears. Disc 51 has a peripheral lateral flange with two peripheral grooves in which are positioned metal slip ring contacts 53 and 55, which are electrically engaged by fixed position spring contacts 57 and 59, respectively. On the inside of the flange of disc 51 is mounted a pair of spaced contacts 61 and 63, of which 61 is connected to ring 53 and 63 to ring 55. A spring pressed push button contact 80 is also mounted on the flange of the disc 51 in position to normally connect contact 61 to contact 63, and to be moved exceptionally by the cam 43 to break a circuit from 61 to 63.

Similar parts mounted on the disc 50 enable the cam 42 to control connection between slip rings 52 and 54 and thus between the fixed contacts 56 and 58. As these parts are identical with those just discussed in structure and arrangement it is not thought necessary to show or describe them.

Two limit switches 64 and 65 are mounted on the standard 24 in position to be actuated by adjustable members 66 and 67, respectively, mounted on the nut 21. A double, manual control switch 68, 69 is also shown as mounted on the standard 24 for convenience, although this switch may be located at any other convenient site. Two self-locking, four contact switches 70 and 71, actuated by solenoids 72 and 73, respectively, are located in any convenient site not shown in Fig. 1.

Figure 2:
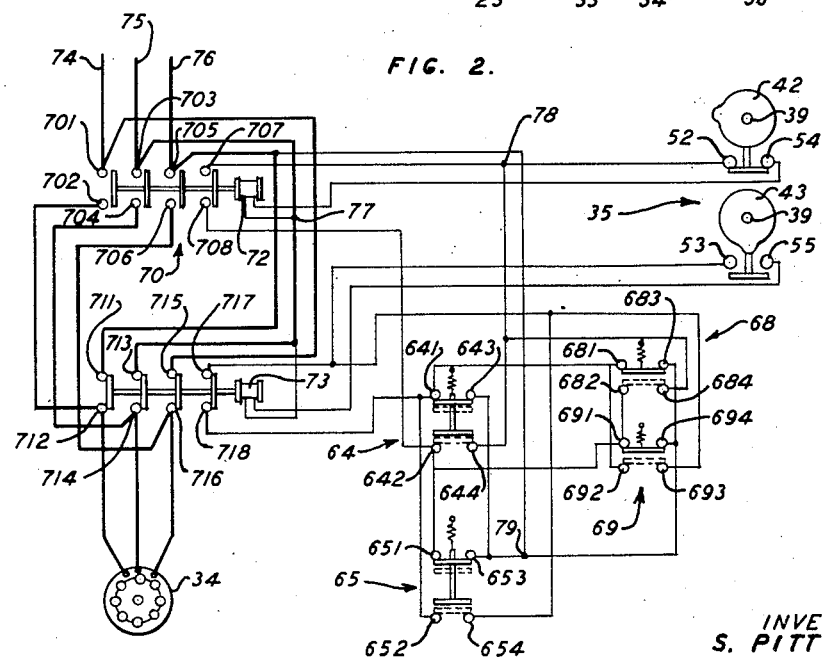
Fig. 2 is a wiring diagram for the invention when linked with the type of apparatus shown in Fig. 1.

Assume now that the apparatus is in operation with the parts in the positions shown in Figs. 1 and 2 and with the nut 21 moving upwardly. The shaft 31 is rotating at all times clockwise, as seen from the left, at constant speed, and hence the disc 30 is rotating in the same direction at all times and at constant speed. The motor 34 is cut off from power since both switches 70 and 71, are open. Hence the shaft 33 and therefore the forked yoke 32 are stationary, and the disc 30 remains in the position shown. Hence the disc 30 drives the disc 29 and gear 27 at constant speed and counterclockwise, as seen from above. The gear 27, therefore, drives the gear 26 and shaft 22 clockwise at constant speed, and the screw shaft 22 drives the nut 21 and strand guide 20 upwards at constant speed, the thread on the shaft 22 being a right hand helix.

This state of affairs continues until the control member 66 on the nut shifts the switch 64 from the solid line position of Fig. 2 to the dotted line position. When this is done, a circuit is closed from the power supply main 75 through terminal 703, branch point 77, solenoid 72, terminals 54, 52, branch point 78, terminals 644, 642, terminals 651, 653, branch point 79, and up and back to terminal 705 and supply main 76, thus energizing solenoid 72 to close switch 70. Immediately this is done a second circuit through solenoid 72 is closed as follows: From 703 through 77, 72, 54, 52, 78, 707, 708, 642, 651, 653, 79 and up and back to 705. This second circuit is independent of the closure at 644, 642 and so keeps the solenoid 72 energized and the switch 70 closed even after the switch 64 is reversed as described below. However, both circuits to energize solenoid 72 depend upon closure at 52, 54 and are broken or held open whenever the cam 42 breaks the connection from 52 to 54.

The switch 70 having been thus closed, power flows from the mains 74, 75, 76 to the motor 34 and drives the latter counterclockwise as seen from the left in Fig. 1. Thereby the disc 30 is shifted to the right, thus slowing, stopping and reversing the disc 29. Hence the nut 21 slows and stops its upward motion and begins to move steadily down again, thus releasing the switch 64 to spring back to the full line position of Fig. 2.

At the same time the motor 34 begins to drive the shaft 39 counterclockwise, as seen in Fig. 2, thus causing the cam 43 to allow closure at 53, 55 and after a predetermined interval (dependent upon the angular relations of the cams 42 and 43 as determined by previous adjustment with the worm shaft 49) causing the connection at 52, 54 to be broken. Breaking this latter connection breaks the second circuit through solenoid 72 described above (the first having already been broken at 644, 642 by reversal of the switch 64) and the switch 70 opens, stopping the motor 34 and therefore the traversing motion of the disc 30. The device 35 stops, when the motor 34 stops, with the connection 52, 54 open and the connection 53, 55 closed.

The nut 21 then continues its steady motion down until the member 67 throws the switch 65. It is not thought necessary to trace out, in detail, the chain of effects thus caused, as this is substantially like that just described except that the ultimate result is to restore the status shown in Fig. 2 with the nut 21 moving up at constant speed.

The general result is that the guide 20 is thus traversed in regular reciprocal motion without further attention so long as the shaft 31 is driven and the mains 74, 75, 76 are energized. The upper and lower limits of the excursion of the nut 21 can be adjusted by adjustment of the members 66 and 67, or by mounting the switches 64 and 65 adjustably on the standard 24. The speed of the nut 21 can be regulated by adjustment of the discs 50 and 51 by rotating the worm shaft 49 to vary the limit of excursion of the disc 30 along the shaft 31, the nearer the limit positions of the disc 30 on either side of the axis of the shaft 28 to that shaft, the more rapid being the normal motion of the nut between reversals.

In other words, the length of time the motor is energized is governed by means actuated by the motor, namely, the mechanism shown in detail in Figs. 3 and 4. By varying the angular relations of the cams 42 and 43 the length of time the motor remains energized is varied.

Supposing that it be desired to wind a prescribed length of strand or cable on a reel, the chances are that the winding will be finished at some practically unpredeterminable fraction of a last layer of winding, and the whole machine will be stopped, to cut the strand and begin to wind another reel, with the nut 21 somewhere between its extreme positions. Closure of either switch 68 or switch 69 will then start the nut 21 toward its lower or upper limit of travel, as may be desired. It is not thought necessary to describe these operations in detail, as switch 68 is electrically in parallel and interchangeable with switch 64 and switch 69 with switch 65.

The embodiments of the invention herein disclosed are illustrative only and can be modified and departed from in many ways without departing from the spirit and scope of the invention as pointed out in and limited solely by the appended claims.

What is claimed is:

1. A control apparatus comprising a reversible electric motor, separate means actuable to cause energization of the motor in forward and reverse motion, means to stop either motion of the motor a variable length of time after it has been energized including a pair of movable switch elements driven by the motor, and means to vary the relative positions of the switch elements equally relative to a neutral point to vary the energized period of the motor in either motion.

2. A control apparatus comprising a reversible electric motor, means actuable to cause energization of the motor in forward or reverse motion, a pair of rotary cams driven by the motor, a rotary support associated with each cam, contact members mounted on each support and actuable by the associated cam, the contact members on one support controlling the forward motion of the motor and the contact members on the other support controlling the reverse motion of the motor, and means to rotate the supports simultaneously to vary the relative positions of the contact members and their cams to vary the length of time the motor is energized in both motions.

3. A control apparatus comprising a reversible electric motor, means actuable to cause energization of the motor in forward or reverse motion, a pair of rotary cams driven by the motor, a rotary support associated with each cam, contact members mounted on each support and actuable by the associated cam, the contact members on one support controlling the forward motion of the motor and the contact members on the other support controlling the reverse motion of the motor, and means operatively connected to both supports to rotate the supports simultaneously to vary the positions of the two sets of contact members to vary the length of time the motor is energized in both motions.

4. A control apparatus comprising a reversible electric motor, means actuable to cause energization of the motor in forward or reverse motion, a pair of rotary cams driven by the motor, a rotary support associated with each cam, contact members mounted on each support and actuable by the associated cam, the contact members on one support controlling the forward motion of the motor and the contact members on the other support controlling the reverse motion of the motor, and means to rotate the supports simultaneously in opposite directions to vary the positions of the two sets of contact members both with respect to the cams and with respect to each other to vary the length of time the motor is energized in both motions.

5. A control apparatus comprising a plurality of switches, a cam for each switch mounted for rotation about an axis, a normally stationary support for each switch disposed adjacent each cam and mounted for rotary adjustment about the axis of its respective cam, and means to rotate the supports simultaneously to vary the positions of the switches to vary the interval of time between the operations by their cams.

SAMUEL PITT.
LESTER O. REICHELT.